Patented Feb. 12, 1946

2,394,833

UNITED STATES PATENT OFFICE 2,394,833

WAX COMPOSITION

Harland H. Young, Chicago, Ill., and David Rubinstein, Brookline, Mass., assignors to Industrial Patents Corporation, Chicago, Ill., a corporation of Delaware No Drawing. Application August 10, 1942, Serial No. 454,304

5 Claims. (Cl. 99—178)

This invention relates to an improved wax composition which is particularly adapted for coating moist and oily surfaces.

In the manufacture of cheese, curd is pressed in a mold which has been partially lined with cheesecloth. The shape of the mold depends upon trade preference in the locality in which the product is to be marketed. It is usual to prepare cheese in the form of blocks or cylinders, most cheese being molded in the form of cylinders of varying sizes such as midgets, twins, daisies, Cheddars, wheels and longhorns.

The molder curd is then placed in a cooler and held at a temperature of from 40° to 45° F. until a partial rind has formed on the surface. The cheese block or cylinder is then generally dipped into a molten wax or wax-like substance to form a protective coating on the surface to prevent drying out of the cheese and to prevent mold growth on the surface of the cheese. Since the surface of the cheese is somewhat moist and oily, the usual waxes and wax-like substances do not form a closely adherent film or envelope about the cheese and mold has an opportunity to start where air is present.

During the aging and storage periods, the cheese is subjected to temperatures below ordinary room temperature and the usual wax-like or paraffin coating which is somewhat brittle becomes checked or broken thereby exposing small areas of the cheese to the atmosphere. The usual paraffin or wax-like coatings are somewhat brittle at the aging and storage temperatures and the coating is easily chipped from the surface of the cheese. Since cheese is an excellent medium for mold growth, the checking or breaking of the coating is followed by an excessive mold growth on the surface of the cheese. This excessive mold growth results in musty flavors, poor appearance and cheese loss due to trimming.

Certain types of cheese such as pasteurized or processed cheese which has become quite popular in recent years are marketed in blocks weighing from ¼ pound to 5 pounds. These blocks are generally enclosed in a wrapper of coated paper, metal foil, cellulose films and the like, or they may be coated with paraffin. In the use of wrappers it is exceedingly difficult to secure an impervious wrapper since it is necessary to overlap or seam the film material. The use of paraffin and the usual wax-like coatings presents the same problems as those encountered in the coating of the cheese curd after molding.

Numerous proposals have been advanced to alter the properties and characteristics of waxes to provide compositions which overcome the checking, cracking and breaking of wax-like coating compositions. In one such proposal, petroleum waxes having different melting points and other physical characteristics are mixed in various proportions to provide a wax-like composition having a somewhat extended plastic range.

Other compositions which have been proposed include the addition of certain materials to the wax or wax-like composition to increase the adherent properties of the wax-like composition to cheese and to provide a coating composition which has a greater pliability over an extended temperature range. In one of such proposals, there is added to the wax-like composition a thermoplastic condensation product obtained by reacting rubber with an amphoteric metal halide. The wax-like base may comprise a petroleum wax such as paraffin and amorphous petroleum waxes, other amorphous waxes such as beeswax or a mixture of two or more waxes.

The thermoplastic derivative of rubber is prepared by reacting rubber in solution in an organic solvent immiscible in water with a halide of an amphoteric metal, for example, stannic chloride, ferric chloride or aluminium chloride. The resulting reaction product is poured into a large volume of water containing a reducing agent such as sodium sulphite and the mixture is then agitated vigorously to produce a fine emulsion. The volatile solvent is then removed as by steam distillation and the thermoplastic condensation derivative is precipitated in finely divided form. The preparation of this product is described in United States Patent No. 2,052,423 granted August 25, 1936, and the commercially available product is known as Pliolite.

The addition of this type of rubber derivative to waxes affects an appreciable increase in the tensile strength and imparts a greater pliability to the wax composition over a wide temperature range. The rubber derivative also increases the hardness and toughness of the wax composition. Various proportions of the rubber derivative may be incorporated into the composition, however, for coating cheese, the preferred compositions contain up to about 10 or 15 per cent of the rubber derivative. If too large a proportion of the rubber derivative is incorporated in the composition, the melting point of the composition is increased to a point beyond that which can be employed in coating cheese. Since the cost of the rubber derivative is quite high, only such proportions are employed as are required to impart to the composition the desired properties. Coating compositions containing about 10 per cent of the rubber derivative have a sufficient pliability as to permit the coating to be peeled from the cheese. The coating remains sufficiently pliable at low temperatures to permit considerable handling without cracking or chipping and does not become sticky or tacky at temperatures as high as 100° F.

One of the objects of this invention is to provide a waxy composition having an extended plastic range.

Another object of this invention is to provide a waxy composition having improved adherent properties particularly with respect to oily and moist surfaces.

Another object of this invention is to provide a waxy composition which is particularly suited as a coating for cheese.

Another object of this invention is to provide a method whereby a waxy composition may be prepared having any desired degree of hardness and spreadability and any desired melting point.

Other objects and advantages of this invention will become apparent from a consideration of the description and claims which follow.

The present invention contemplates the incorporation in waxy compositions reaction products obtained by reacting an alkylolamine or substituted alkylolamine with an acylating substance capable of replacing reactive acylatable hydrogen atoms such as amino hydrogen or alcoholic hydroxyl hydrogen.

The products obtained by reacting an alkylolamine with an acylating substance may consist of a number of individual compounds. In the case of alkylolamines having at least one amine hydrogen atom, the reaction product will be an alkylolamide, an alkylolamine soap, an alkylolamine ester, an alkylolamide ester or a mixture of two or more of the substances. The proportion of the various materials formed is dependent upon the reactants and upon the conditions maintained during the reaction period.

It is obvious that in the case of tertiary alkylolamines which contain no amino hydrogen atoms there is no amide formed under ordinary conditions and that the reaction products will consist essentially of amine esters and amine ethers. Ordinary soaps of alkylolamines such as monoethanolamine, diethanolamine and triethanolamine oleates are not effective for the purposes of the present invention. Amide esters have some action but are not as effective as other reaction products. Alkylolamides, amine esters and certain of their reaction products with free alkylolamines are the most effective substances for the purposes of our invention.

For the purposes of the present invention, the alkylolamides and substituted alkylolamides have been found to be particularly effective. These substances may be represented by the following general formulas:

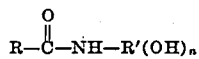

and

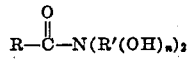

where R is an alkyl or substituted alkyl group, either saturated or unsaturated, preferably containing at least 6 carbon atoms, which group occurs in or may be considered as being derived from fats and oils, or is an aromatic, hydroaromatic, heterocyclic or other carbon containing nucleus. When the radical, R, is linked to a carboxyl group, the compound is a carboxylic acid and may be classed as a lypophyllic carboxylic acid.

Examples of carboxylic acids, the alkylolamides of which are satisfactory for the purposes of the present invention, may be divided into three groups, namely, the saturated, unsaturated and substituted carboxylic acids.

Examples of saturated carboxylic acids which are satisfactory are caprylic, pelargonic, capric, lauric, myristic, palmitic and stearic acids.

Examples of satisfactory unsaturated acids are elaidic, oleic, linoleic, linolenic, geranic, dehydrogeranic, elaeostearic, and palmitoleic acids. Other fatty acids normally occurring in marine oils are also satisfactory for the purposes of this invention.

Examples of satisfactory substituted acids are hydroxystearic, dihydroxystearic, ricinoleic, hydnocarpic and chaulmoogric acids. Although only hydroxy substituted acids have been enumerated, other substituents are satisfactory and may be desired to impart or promote certain desired characteristics, as will be pointed out hereinafter.

The reaction products including alkylolamides for use in the practice of the present invention may be conveniently prepared from fatty acids such as those derived by the oxidation of petroleum hydrocarbons or by the hydrolysis of animal, marine and vegetable fats and oils. Other acids suitable for the purposes of this invention are those of tall oil, gums, rosin, waxes and those derived from aromatic or hydroaromatic hydrocarbons.

The radical, R', is a carbon containing radical linked, on one hand, to the amide nitrogen, and, on the other, to one or more hydroxyl groups. Examples of satisfactory radicals are ethanol, propanol, isopropanol, trishydroxymethyl methane, 2-ethyl propane diol 1,3, 2-methyl propane diol 1,3, and 1,2 dihydroxy propane.

The letters, C, O, N and H, designate carbon, oxygen, nitrogen and hydrogen, respectively, and "$n$" designates a small whole number.

The nitrogen bases whose normal acyl derivatives are satisfactory for the purposes of the present invention belong to a large group of substances known generally as the primary and secondary alkylolamines. By way of example, but not by way of limitation, the following alkylolamines may be enumerated as being satisfactory for the preparation of the alkylolamides for the purpose of this invention: monoethanolamine; diethanolamine; monopropanolamine, $$NH_2—CH_2—CHOH—CH_3$$

and $HOCH_2—CHNH_2—CH_3$; dipropanolamine, $NH(CH_2CHOH—CH_3)_2$ and $$(HOCH_2—CH(CH_3))_2NH$$

trishydroxymethylamino methane; 2-amino 2-methyl propane diol 1,3; 2-amino 2-ethyl propane diol 1,3; $\beta,\gamma$dihydroxy propyl amine; bis ($\beta,\gamma$dihydroxy propyl) amine. It will be understood that numerous other alkylolamines, such as those containing more than one amine function are satisfactory, as for example, 2-hydroxy 1,3 diamino propane.

The compounds which have been discovered to be particularly effective and useful for the purposes of this invention are the normal acyl derivatives of the primary and secondary alkylolamines or, synonymously, hydroxy-alkyl amides, and of the primary and secondary substituted alkylolamines. The examples enumerated below are divided into three groups, the compounds of Group A consisting of alkylolamides containing one hydroxyl group and one acyl group, the compounds in Group B consisting of alkylolamides containing two hydroxyl groups and one acyl group, and the compounds in Group C consisting of alkylolamides containing three or more hydroxyl groups and one acyl group. The structural formulas of these compounds may be represented as follows:

Group A

RCONH—CH₂CH₂OH
RCONH—CH(CH₃)CH₂OH
RCONH—CH₂CHOHCH₃

Group B

RCONH—CH₂CHOHCH₂OH
RCON(CH₂CH₂OH)₂
RCONH—C(CH₂OH)₂CH₃
RCONH—C(CH₂OH)₂C₂H₅
RCON(CH(CH₃)CH₂OH)₂
RCON(CH₂CHOHCH₃)₂

Group C

RCONH—C(CH₂OH)₃
RCON(CH₂CHOHCH₂OH)₂

Various methods may be employed in the preparation of the alkylolamides or reaction products, three of the more common of which may be briefly described as follows: The alkylolamine and the lypophyllic carboxylic acid are mixed in the proportion of at least one mole of the alkylolamine to one mole of the acid at temperatures above the boiling point of water. The soap or salt which is first formed by the reaction is then heated to drive off water to form the amide. The reaction product of this method may, however, include some soap or salt which has not been converted to the amide. The reaction product may be subsequently bleached and deodorized by conventional methods well known to those familiar with the processing of fats and oils.

A further common method for preparing the alkylolamide or reaction product is by the reaction of the acid chloride of the carboxylic acid with the alkylolamine in the proportion of one mole of the acid chloride to at least one mole of the alkylolamine. This reaction is preferably carried out at low temperatures in the presence of pyridine or quinoline or other nitrogen containing compound having the ability to fix the hydrogen chloride evolved during the reaction. In this synthesis care must be exercised due to the reactivity of the alcoholic function in the alkylolamine toward the acid chloride.

In another of the common methods, an alkylolamine and a triglyceride, such as a fat or oil, for example, a vegetable oil such as coconut oil, cottonseed oil or partially hydrogenated cottonseed oil, are mixed in the proportion of at least three moles of the alkylolamine to one mole of triglyceride. The mixture is heated to temperatures at which glycerol splits out and three moles of the alkylolamide are formed. This method is particularly satisfactory in the preparation of the improving agents from fats and oils for the purposes of the present invention. It is apparent that the reaction product consists of a blend of alkylolamides of the various fatty acids present in the triglyceride, and may include other reaction products, as will be described hereinafter.

The reaction products may be obtained by reacting an alkylolamine with any acylating substance capable of replacing reactive hydrogen atoms, such as the amino hydrogen and hydroxyl or alcoholic hydrogen with a lypophyllic group. Lypophyllic groups which are preferred for the purposes of the present invention are those having from 6 carbon atoms to 14 carbon atoms because, in general, reaction products containing such groups are more active than very low or very high homologues. For example, reaction products containing oleic, stearic and palmitic acid radicals possess the desired action, but because of their lower solubility in water, they are not as effective or potent as those reaction products containing the preferred radicals, such as those found in coconut, palm kernel and other oils of this family. For certain specific purposes, however, reaction products having the higher radicals may be preferred, as will be pointed out hereinafter.

Similar methods may be employed in which esters of other alcohols, for example, ethyl alcohol, glycol and diethylene glycol, may be used in place of the triglycerides as the source of the lypophyllic carboxylic acid. More complex fatty acid esters, such as phosphatides, may also be employed as the lypophyllic carboxylic acid or fatty acid source.

Variations in the amounts and proportions of reactants may be employed in these methods to affect the speed of reaction and control the properties of the reaction product, for example, an excess of alkylolamine may be used to increase the speed of reaction, particularly at lower temperatures. We prefer to employ a slight excess of alkylolamine in forming the reaction products to both increase the speed of reaction and to keep the amount of amide esters formed to a minimum, and to insure the formation of a large proportion of the alkylolamide since the alkylolamide is more effective. It is also apparent that catalysts may be employed to increase the speed of reaction.

Although alkylolamides may be the principal products obtained by the reaction of primary and secondary alkylolamines with fats, fatty acids or other acylating substances, certain other products may be formed to an appreciable extent. The proportion of the various products present in the reaction mass will be governed by the conditions maintained during the reaction period. For example, when diethanolamine and a higher fatty acid are heated together, six simple products may be formed, namely, the alkylolamide, the alkylolamine soap, an alkylolamine monoacid ester, an alkylolamine diacid ester, an alkylolamide monoacid ester and an alkylolamide diacid ester. Secondary reactions involving condensation or a polymerization may also be formed. These secondary condensation products result from the condensation of free or excess amine with the products already formed. In the reaction of monoethanolamine and lauric acid, for example, the monoethanolamide of lauric acid might form a condensation product with excess alkylolamine so as to yield an alkylolamide-ether-amine,

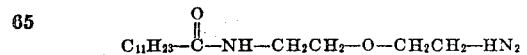

In the preparation of reaction products from diethanolamine, for example, further possibilities and probabilities are introduced for occurrence of secondary reactions. Diethanolamine, having additional reacting groups, leads to the formation of still more complex mixtures among which are heterocyclic derivatives. For example, prolonged heating of the diethanolamide of palmitic acid results in loss of water and may lead to the formation of the morpholine derivative:

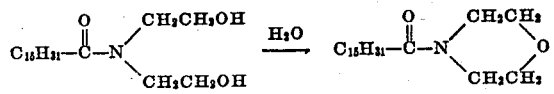

In the preparation of these compounds involving the reaction of alkylolamines with carboxylic acids, their esters and related acylating substances, there is involved a complex equilibrium. For example, one mole of lauric acid and one mole of diethanolamine melted together below 100° C. produce a soap, diethanolamine laurate. Subsequent heating removes water to yield the alkylolamide. Simultaneously, an equilibrium is set up between the isomeric alkylolamide and alkylolamine ester:

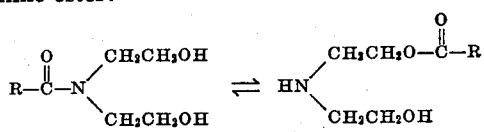

Further, any excess acid tends to acylate either of these isomers, thereby decreasing their potency. For this reason, it is preferred that an excess of amine be employed so as to force the equilibrium toward acylation of only one acylatable hydrogen per mole of alkylolamine.

Reaction products derived from tertiary amines by reacting one or more of the hydroxyl groups of the alkylolamine with an acylating substance may also be employed in the practice of this invention. All of the hydroxyl groups, however, are not replaced by or reacted with the acylating substance unless other free amine groups are available to impart to the product hydrophylic properties.

The amine esters which are also effective for the purposes of this invention may be represented by the following general formulas:

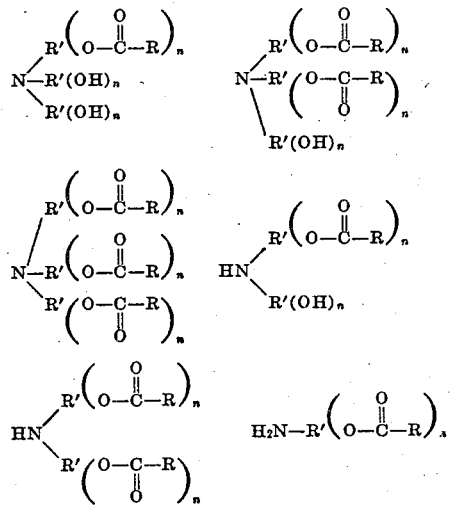

where R is an alkyl, or substituted alkyl group either saturated or unsaturated, preferably containing at least 6 carbon atoms which group occurs in or may be considered as being derived from fats and oils, or is an aromatic, hydroaromatic, heterocyclic or other carbon containing nucleus. This group imparts to the compound its lypophyllic properties, and when linked to a carboxyl group, the compound may be classed as a lypophyllic carboxylic acid or one which is but slightly soluble in water. The same classes of acids or acylating substances are satisfactory for the preparation of the amine esters as are satisfactory for the preparation of the alkylolamides.

The radical, R', is a carbon containing radical linked, on one hand, to the amide nitrogen, and before reaction with the lypophyllic carboxylic acid, is linked, on the other hand, to one or more hydroxyl groups. The radical, R', corresponds to the same radical set forth in the general formulas of the alkylolamides.

The letters, C, O, N, and H, designate carbon, oxygen, nitrogen and hydrogen, respectively, and "$n$" designates a small whole number.

The nitrogen bases from which the esters may be prepared or from which they may be derived are known generally as primary, secondary and tertiary alkylolamines. By way of example, but not by way of limitation, the following tertiary alkylolamines may be enumerated as being satisfactory for the purposes of this invention, primary and secondary alkylolamines are enumerated above: triethanolamine; tripropanolamine, for example, $$N(CH_2-CHOH-CH_3)_3$$

and $(HOCH_2-CH(CH_3))_3N$; dialkylamino ethanols, ; and the like. It will be understood that many other tertiary alkylolamines such as those containing more than one amine function are also satisfactory for the purposes of this invention, as for example, NNN'N'-tetra-alkyl 1,3 diamino propanol-2,

Various methods may be employed in the preparation of the amine esters or reaction products. The alkylolamine and a lypophyllic carboxylic acid or other acylating substance may be mixed in the proportion of preferably at least one mole of the alkylolamine to one mole of the acid to form a compound in which one hydroxyl group on the alkylol radical or group is replaced by the acid radical. The resulting product will correspond to the first of the general formulas for the amine esters. The equilibrium discussed above will also occur in the formation of the esters. If twice the amount of acid is used in the reaction, the product will correspond to the second of the general formulas for the amine esters.

In place of the lypophyllic carboxylic acid, other acylating substances capable of replacing reactive or acylatable hydrogen, such as alcoholic hydroxyl hydrogen, with a lypophyllic group may be employed.

It is also possible to employ ethers; however, their cost and the difficulty of preparation of these compounds militates against their use.

By way of illustration, but not by way of limitation, alkylolamides which have been found to be entirely satisfactory for the purposes of our invention include the amides or reaction products prepared by reacting ricinoleic, palmitic and lauric acid with monoethanolamine, diethanolamine, trishydroxymethylaminomethane and 2-amino 2-methyl propanediol 1:3. Reaction products derived from maleic acid have also been found to be satisfactory. Alkylolamine esters prepared by reacting ricinoleic acid, lauric acid and myristic acids with monoethanolamine, diethanolamine and triethanolamine have also been found to be entirely satisfactory. The particular agent incorporated in the waxy compositions need not be the pure amide or amine ester but may be the reaction product of the particular reaction and may include by-products and catalysts such as amine esters, amide esters, certain condensation products and the like, as described hereinbefore.

We have discovered that the addition of such an agent to a waxy composition effects an appreciable increase in the adherent properties of the waxy composition to surfaces including oily and moist surfaces and paraffin and other waxes which do not contain such an agent. The increase in adherent properties is not dependent upon the nature of the waxy composition but is obtained upon the addition of the agent to any waxy composition.

The hardness of the waxy composition may be altered by the addition of certain of the agents or reaction products contemplated by our invention. Reaction products derived from diethanolamine and relatively highly unsaturated acid radicals may be liquid or plastic at ordinary temperatures and may be employed to reduce the hardness of the composition. Reaction products derived from saturated acids and from the higher molecular weight acids are relatively hard and may be employed in increasing the hardness of the composition. The melting point of the composition may also be varied in a similar manner, the relatively soft reaction products lowering the melting point, and the relatively hard reaction products increasing the melting point. If no alteration of the hardness and melting point is desired, a reaction product having about the same hardness and melting point as the waxy composition may be employed.

The addition of the agents contemplated by this invention to a waxy composition increases the pliability of the waxy composition and may extend the pliability range, dependent upon the properties of the particular reaction product.

The particular amount of reaction product employed in admixture with the waxy composition may be varied over a considerable range, the particular amount employed being dependent upon the nature and properties of the waxy base, the nature and properties of the particular reaction product and the properties desired in the final composition. In general, amounts up to about 30 per cent of the reaction products may be employed, the preferred amounts being between about 5 per cent and 15 per cent.

Ordinary paraffin wax as conventionally employed in coating cheese may be improved by the addition of from 10 per cent to 15 per cent of a reaction product of the type described herein. Such a waxy composition has a fair degree of adherent properties and will adhere to the surface of cheese to a fair extent. Such coating will not chip or crack to any appreciable degree. Such a waxy composition may be employed in coating molded cheese before it has been subjected to the atmosphere to a sufficient degree to permit the formation of a rind. The paraffin wax without these reaction products can not be employed in such a manner.

Cheese which has been handled in the conventional manner and which has been aged may be provided with a secondary coating of a waxy composition of the present invention. A cylinder of cheese, for example, which had been pressed, set aside to permit the formation of a rind coated with the usual paraffin wax and aged for 60 days, may be cleaned by wiping to remove the oily film, slime and mold on the surface and then dipped or coated by other means with a waxy composition consisting of about 90 per cent amorphous wax having a melting point of 130° to 135° F. and about 10 per cent of a reaction product of the type described herein. It is well-known that a secondary coating of ordinary paraffin waxes generally chips and peels and is not very satisfactory. A secondary coating of the waxy composition of this invention is highly adherent and permits considerable handling without chipping or breaking from the surface.

In the coating of cheese, the usual paraffin wax composition has been replaced in many instances with a mixture of petroleum waxes having different melting points. These mixtures may consist of two or more petroleum waxes. In general, the specific waxes and the proportions of each is selected to provide a waxy composition having a melting point of from about 130° to about 150° F. A mixture of paraffin and an amorphous petroleum wax having a melting point of about 140° to 145° F. or a mixture of paraffin, an amorphous wax having a melting point of about 140° to 145° F. and an amorphous wax having a melting point of about 160° to 165° F. have been employed in coating cheese. The proportions of the various ingredients may be varied to impart certain desired properties and may be varied to meet particular conditions.

A mixture of about 45 per cent paraffin wax, 45 per cent amorphous wax having a melting point of about 155° to 160° F. and 10 per cent reaction products of the type described herein may be employed in coating various cheese products. Such a waxy composition may be employed in coating green cheese, pasteurized cheese, aged cheese from which the conventional paraffin and rind have been removed and in providing a secondary coating over the conventional coating on aged cheese. This waxy composition has a fairly wide plastic range, has excellent adherent properties and permits considerable handling of the cheese without checking or cracking.

A highly satisfactory coating for cheese may be prepared by mixing about 30 per cent paraffin, about 40 per cent cerese, about 15 per cent candy wax and about 15 per cent reaction products of the type described herein. Cerese is a relatively high melting petroleum wax. Candy wax is a mixture of amorphous petroleum waxes. Such a wax furnishes an excellent composition for providing aged cheese with a secondary wax coating for marketing purposes.

Paraffin, petroleum waxes and other waxy compositions containing a thermoplastic condensation derivative of rubber as described herein are quite satisfactory in the coating of cheese. These compositions have a fairly high tensile strength and a fair degree of pliability over a wide temperature range when compared with the properties of the usual paraffin or waxy substances employed in coating cheese. This type of waxy composition also possesses a greater adherent property than the usual paraffin. The waxy compositions which are quite satisfactory may be prepared from a single wax or from a mixture of waxes such as those set forth hereinbefore to which has been added from 8 per cent to 12 per cent of the thermoplastic condensation derivative of rubber. The further addition of from 5 per cent to 15 per cent of the reaction products described herein greatly increases the desirable properties of the waxy compositions. The presence of the reaction products further extends the plastic range of the waxy composition and greatly increases the adherent properties of the waxy composition, particularly with respect to oily, moist and waxy surfaces.

A composition consisting of about eight parts of a waxy base, one part of synthetic rubber derivative and one part of a reaction product of a type described herein provides an excellent coating for pasteurized cheese blocks. This coating composition may be dyed any desired color for marketing purposes and may be employed to replace the usual metal or cellulose wrapper and provides a far superior envelope for the cheese. This coating may be stripped or peeled from the cheese when desired. The coating will not chip or crack although the coated cheese may be subjected to considerable handling at cold storage temperatures.

More complex mixtures of waxes and various modifying agents may also be improved by the addition of the reaction products of the present invention. In compounding waxy substances, a paraffin wax having a melting point of about 125° to 127° F. may constitute the larger part of the composition and may contain various amounts of other petroleum waxes such as amorphous petroleum waxes having various melting points. The waxy base may also consist of various portions of amorphous petroleum waxes having various melting points. Rosin and ester gum may be added to the waxy base in amounts up to about 5 per cent to stiffen the composition and to raise its melting point. Waxes such as ceresin, beeswax, spermaceti, carnauba, candelilla and the like may be employed in various amounts, for example, up to about 10 per cent to increase the hardness of the composition. If a waxy base containing all of the foregoing substances is prepared, the thermoplastic condensation of derivative may be added in amounts up to 15 per cent to 20 per cent to increase the flexibility or pliability of the composition. Such compositions may be improved greatly by incorporating in the waxy composition an amount of a reaction product of the type described herein.

We are familiar with the proposals which have been made to incorporate in waxy compositions esters of polyhydric alcohols and higher fatty acids containing at least one free alcoholic hydroxy group in the alcoholic component of the ester such as monoacid and diacid glycerides. We have found that waxy compositions containing the reaction products described herein are superior to compositions containing corresponding amounts of these esters such as monoglycerides. Since the hardness, melting point, consistency and like characteristics of the reaction products described herein may be easily varied over an exceedingly wide range, the practice of the present invention is far more flexible than the use of waxy compositions modified by the addition of such esters.

The waxy compositions of this invention are smoother and present a more polished appearance than ordinary paraffin in addition to having the desirable properties of being far more flexible and pliable and far more adherent to surfaces, particularly oily and wet surfaces, which may or may not be present at the same time. The use of the waxy composition of the present invention in coating cheese eliminates the usual drying period whereby the cheese is subjected to the atmosphere to form a rind. The elimination of the necessity of a rind eliminates the loss which is incurred when the cheese is trimmed before use. Cheese, for example, which has been coated with a waxy composition of the present invention may be held at lower temperatures than cheese coated with other waxy compositions with a greatly reduced danger of surface cracking and checking. Cracking, checking and breaking of a cheese coating results in a shrinkage loss caused by the loss of moisture through evaporation and the loss of oil or fat from cheese. The waxy composition of this invention greatly reduces the possibility of such shrinkage losses.

A large number of individual alkylolamides or amide esters or amine esters may be employed in the practice of the present invention. We have found that satisfactory agents may be conveniently prepared by reacting triglycerides such as vegetable oils, for example, cocoanut oil, cottonseed oil, soy bean oil or their hydrogenation products with monoethanolamine or diethanolamine in the proportion of about one mole of the triglyceride to at least one mole of the ethanolamine. Satisfactory reaction products may also be prepared from lauric and oleic acids and diethanolamine and palmitic and stearic acids and monoethanolamine and diethanolamine. The lauric and oleic acid reaction products are relatively soft and may be employed to lower the melting point and to soften or render a waxy composition somewhat more pliable. The palmitic and stearic acid derivatives are relatively hard and may be employed in some cases to increase the hardness of a waxy composition.

In the various specific waxy compositions enumerated herein, no specific reaction product, amide, or amine ester, or the like has been included since those reaction products enumerated above may be employed in the various compositions to provide these desired waxy coating compositions. It will be obvious to those skilled in the art that the waxy compositions of the present invention may be employed in a wide variety of applications and that the use of these waxy compositions is not limited to the coating of cheese.

We claim:

1. The method of preparing a wax-like composition adapted for coating cheese to form a coating which is pliable over a wide temperature range which comprises melting a petroleum wax, adding thereto up to about 10 per cent thermoplastic condensation product obtained by reacting rubber with an amphoteric metal halide and adding to such mixture a reaction product obtained by reacting an alkylolamine with an acylating substance which replaces at least one but not all reactive acylatable hydrogen atoms of the class consisting of amino hydrogen and hydroxyl hydrogen with a lypophyllic group.

2. A waxy composition adapted for coating cheese to form a coating having an extended plastic range which comprises petroleum wax, up to about 10 per cent thermoplastic condensation product obtained by reacting rubber with an amphoteric metal halide and an amount of a reaction product obtained by reacting an alkylolamine with an acylating substance which replaces at least one but not all reactive acylatable hydrogen atoms of the class consisting of amino hydrogen and hydroxyl hydrogen with a lypophyllic group.

3. The method of protecting cheese from mold growth and loss of moisture which comprises coating the cheese with a homogeneous mixture of wax and about 5 to 30 per cent of a reaction product obtained by reacting an alkylolamine with an acylating substance which replaces at least one but not all reactive acylatable hydrogen atoms of the class consisting of amino hydrogen and hydroxyl hydrogen with a lypophyllic group.

4. The method of coating cheese, which comprises applying to the surface of the cheese a waxy mixture containing essentially a petroleum wax and from 5 to 30 per cent of the reaction product of an alkylolamine with an acylating substance which replaces at least one but not all reactive acylatable hydrogen atoms of the class consisting of amino-hydrogen and a hydroxyl hydrogen with a lypophyllic group, said mixture having the properties of adhering firmly to the cheese and being plastic over a wide range of temperature.

5. A process of coating cheese, which comprises applying to the surface of the cheese a coating containing essentially a mixture of petroleum wax, not more than 10 per cent thermoplastic condensation product obtained by reacting rubber with an amphoteric metal halide and from 5 to 30 per cent of the reaction product of an alkylolamine with an acylating substance, which replaces at least one but not all reactive acylatable hydrogen atoms of the class consisting of amino-hydrogen and hydroxyl hydrogen with a lypophyllic group.

HARLAND H. YOUNG.
DAVID RUBINSTEIN.